June 9, 1959     D. E. COOPER     2,890,109
MELTING REFRACTORY METALS
Filed May 5, 1958
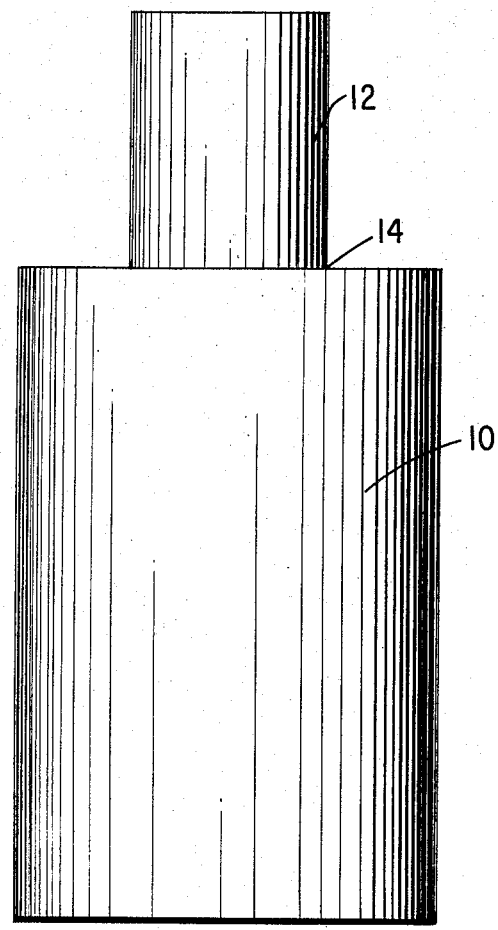
INVENTOR.
Donald E. Cooper
BY
Agent

United States Patent Office 2,890,109
Patented June 9, 1959

2,890,109

MELTING REFRACTORY METALS

Donald E. Cooper, Las Vegas, Nev., assignor to Titanium Metals Corporation of America, New York, N.Y., a corporation of Delaware Application May 5, 1958, Serial No. 732,910

2 Claims. (Cl. 75—10)

This invention relates to consumable arc melting of refractory metals and more particularly to the elimination or reduction of pipe and voids in ingots produced by such melting operations.

Arc melting employing a consumable electrode results in progressive transfer of the electrode metal into a crucible where it also progressively freezes to produce a solid ingot. There is at all times during melting a pool of molten metal on top of the already solidified portion of the ingot. At the end of the melting operation, when the current is shut off, pipe and voids in the ingot are formed in the top of the ingot during solidification of the residual pool of molten metal. Pipe is a term describing a funnel shaped depression in the ingot top caused by contraction during freezing and cooling and its lower end may extend for an appreciable distance into the ingot. Often freezing of the uppermost layer of metal occurs before that more centrally located and the resulting contraction during solidification of the last remaining molten metal causes voids or shrinkage cavities of substantial size in the ingot. The presence of pipe and voids render the portion of the ingot containing them unsound, and removal of an appreciable section of each ingot due to this cause results in large economic loss.

In other types of melting processes, pipe and voids are reasonably well controlled by maintaining the top of the ingot hot enough during cooling so that the top surface is the last to freeze. "Hot topping" procedures heretofore employed have not proved effective in consumable electrode arc melting, however, because by its nature, the arc to supply "hot topping" heat also results in transfer of additional molten metal. In addition, reduction in amount of current supplied has often resulted in dangerous and undesirable glow discharge, particularly when the process is operated under vacuum.

It is the principal object of this invention to provide improvement in the method for consumable electrode arc melting a refractory metal. Another object is to provide improvement in the method for consumable electrode arc melting a refractory metal to produce an ingot free from pipe and voids. These and other objects of this invention will be apparent from the following description thereof.

This invention in its broadest aspects contemplates improvement in consumable electrode arc melting of a refractory metal which comprises first forming said metal into a consumable electrode having a body portion and a reduced diameter upper neck portion. The body portion of the electrode is then arc melted employing electric current of between 500 and 1500 amperes per inch of electrode body diameter. When the body portion of the electrode has been consumed to the juncture of the body and neck portions thereof, the electric current supplied is reduced to provide amperes per inch of neck diameter between the same and one-sixth of the amperes per inch of diameter employed while melting the body portion, with the high portion of this range of current being employed when amperage in the high portion of the body melting range is used. Melting of the neck portion is continued until sufficient of the metal thereof has been melted to at least replace the shrinkage volume in the top of the ingot produced by melting the body portion of the electrode.

A type of electrode advantageously employed in the practice of this invention is illustrated in the drawing. A consumable electrode is formed having an elongated body portion 10 and a neck portion 12 of reduced diameter. The juncture of these two portions is considered the shoulder 14.

The term refractory metal, as employed herein to identify those adapted for processing according to this invention, is intended to include high melting point metals which are advantageously or necessarily melted by an electric arc and including among others, titanium, zirconium, niobium, tantalum, molybdenum, tungsten, vanadium, and alloys of which they are the base metal, as well as various steels and so-called super-alloys.

The electrode may be formed in any convenient manner. It may, for example, be cast as an integral unit in a mold to provide the required body and reduced diameter neck portion. It may be formed by joining a body portion to a neck portion as by welding or brazing at the shoulder 14. Since the neck portion will also be at least in part melted along with the body portion care should be taken under these conditions to provide non-contaminating weld metal if such is employed. Another method of forming the electrode would be to machine one end of a uniform diameter body to produce the neck portion. The cross section of the body and neck will be generally or roughly circular. A polygonal cross section may be used, preferably hexagonal or with greater number of sides so as to approach circular configuration.

The diameter of the neck portion of the electrode is between one-half and one-third the diameter of the body portion and these limits are critical. Larger than one-half the body diameter will not provide the necessary central concentration of heat during the hot topping part of the melting cycle. Less than one-third of the body diameter will often not provide in the neck sufficient mechanical strength to support the heavy body portion nor will it provide sufficient electric current carrying capacity to transfer efficiently the heavy current required during melting of the body portion of the electrode.

The electrode is melted in a consumable electrode arc melting furnace of any suitable or conventional design. Such furnaces are well known in the art, are commercially available and form no part per se of this invention. The furnace will ordinarily include means for controlling the gradual lowering of the electrode into a cooled crucible or mold at such rate to maintain the desired arc between the bottom of the body of the electrode, which is suspended in any suitable manner by its neck, and molten metal transferred therefrom, by melting into the crucible. The furnace interior may contain an atmosphere of inert gas, such as helium or argon under atmospheric or higher or lower pressure, or may be evacuated to provide a vacuum therein. A suitable power supply is arranged to provide high amperage electric current, one connection being made, by any intermediate means, to the neck of the electrode and the other to the crucible into which the electrode is melted.

The body portion of the electrode according to this invention is melted employing current of between about 500 and 1500 amperes per inch of body diameter. The precise amperage will be selected depending on the desired melting rate, the metal or alloy being melted and the characteristics of the furnace as will be apparent to those skilled in the art. The voltage of the power supply may conveniently be between 20 and 80 volts although this factor is not critical and may vary widely. Melting of the electrode is continued under these conditions until all the metal constituting the body portion has been melted and transferred into the crucible. At this point, when the electrode has been consumed to the shoulder where the neck joins the body, an abrupt reduction in the amperage of the electric power supplied to the furnace is effected. The current should be reduced at this time so as to provide amperes per inch of neck diameter between the same and one-sixth of the amperes per inch of diameter employed while melting the body portion, with amperage in the higher portion of this range employed when the amperage in the higher portion of the 500 to 1500 amperes per inch of diameter range is used during the melting of the body. The current used will now be determined by the diameter of the neck portion of the electrode and since its diameter will be between one-third and one-half the diameter of the electrode body portion, a substantial reduction in the current supplied will be necessary to provide current on an amperes per inch of diameter basis within the range of between the same and one-sixth of that supplied on the same basis when melting the body portion of the electrode. During melting of the body portion of the electrode, current supplied within the range described will be found to provide adequate melting rate and efficient transfer of the metal from the electrode into the crucible to form the ingot. The current supplied while melting the neck portion of the electrode will be substantially less in total amount but may vary within the range described to produce the desired central concentration of heat without transfer of excessive amount of metal from the electrode to the ingot.

It will be found that when amperage in the higher portion of the range for melting the body is employed for various reasons, which may depend on the furnace design, melting rate desired and other factors, then amperage in the higher portion of the neck melting range will be necessary. This occurs because under conditions employing high amperage during body melting the lower portion of the range of neck melting current will not provide sufficient current for desired arc operation and efficient hot topping. When current in the lower portion of the range described for body melting is employed however, from the same to one-sixth of the amperes per inch of diameter may be employed for the neck melting step.

Melting of the neck portion employing the current described is continued until sufficient metal has been melted to at least replace the shrinkage volume in the top of the ingot produced by melting the body portion of the electrode. It is necessary to melt sufficient of the neck portion of the electrode to insure transfer of enough metal to fill the void or depression otherwise created by shrinkage of the metal at the top of the ingot. Additional metal may be transferred without harm, although for further processing it is generally desirable that ingots of this type be relatively flat across their upper surface or slightly convex.

During melting of the body portion of the electrode the top portion of the ingot does not solidify but forms a pool of molten metal. When the current is abruptly reduced on reaching the juncture of the body portion and neck portion of the electrode and melting continues at the lower current input rate the molten pool is gradually reduced in diameter as the outer edges of the ingot begin to solidify. It is convenient to determine the amount of metal to be melted from the neck portion of the electrode by observing the diameter of the molten pool and when this becomes less than about one and one-third times the diameter of the neck portion of the electrode it will be found that sufficient neck portion metal has been transferred to make up for volume loss in the top of the ingot resulting from cooling shrinkage.

It is postulated that the neck portion metal added centrally and slowly as the ingot cools fills up the shrinkage depression otherwise formed in the ingot. At the same time the central portion of the ingot is maintained hot and largely molten so that pipe, internal voids and cavities are avoided.

The following provides an example of the operation of the process of this invention.

*Example 1*

A consumable electrode of titanium metal was formed having an 8 inch diameter, round body, approximately 48 inches long and a 3 inch diameter neck portion of several inches in length. The total weight of the ingot was approximately 360 pounds. A conventional consumable electrode arc melting furnace was employed having a crucible of 12 inches internal diameter. The 8 inch diameter body portion of the electrode was melted and transferred into the crucible employing 6000 amperes of current at 30 volts which corresponded to 750 amperes per inch of electrode body diameter. Metal was melted and transferred from the body to the crucible at a rate of 7.3 pounds per minute. The melting amperage was applied and melting of the body portion continued until all the body portion of the electrode was consumed and the juncture with the 3 inch neck portion was reached. At this time the melting current was abruptly reduced to 850 amperes, which corresponded to about 283 amperes per inch of neck diameter and represented roughly one-third of the current per diameter inch used on the body. With this current the neck portion was melted at a rate of .015 pound per minute. During the time the neck portion was thus being melted the molten pool at the top of the ingot was observed through a sightport in the side of the furnace. After the current was abruptly decreased the pool gradually decreased in diameter and when the pool was 4 inches in diameter melting was discontinued and the current shut off. One inch length of the neck portion had been consumed during the 20 minute operation of reduced current melting. The ingot after solidification showed an approximately level and even top surface, indicating that the amount of metal transferred during melting of the neck had replaced the shrinkage volume ordinarily occurring.

The top portion of the 12 inch ingot produced by this melting cycle was machined smooth and the ingot examined by ultrasonic inspection. No evidence of internal voids was found. The ingot was then sectioned longitudinally and no voids, cavities, or pipe were found in the ingot.

The ingots produced by the process of this invention are useful for production of finished and semi-finished shapes of the refractory metal melted. Being free from pipe, voids and cavities they are more efficiently converted by rolling, forging or other further process into products such as billet, bar, sheet, strip, rod and wire.

I claim:

1. In a method for arc melting a consumable electrode of a refractory metal to produce an ingot, the improvement which comprises; forming said electrode having a body portion joined to a neck portion of diameter between one-half and one-third of the diameter of said body portion, arc melting said body portion of said electrode employing electric current within the range between 500 and 1500 amperes per inch of electrode body diameter, and when the electrode has been consumed to the juncture of the body and neck portion reducing the electric current employed to provide amperes per inch of neck diameter between the same and one-sixth of the amperes per inch of diameter used while melting the body portion and employing the upper portion of the range of neck melting amperage when the body has been melted using current within the upper portion of its amperage range, and continuing to melt the neck portion of said electrode employing said reduced current until sufficient neck portion metal has been melted to at least replace the shrinkage volume in the top of the ingot produced by melting the body portion of said electrode.

2. In a method for arc melting a consumable electrode of a refractory metal to produce an ingot, the improvement which comprises; forming said electrode having a body portion joined to a neck portion of diameter between one-half and one-third of said body portion, arc melting said body portion of said electrode employing electric current within the range between 500 and 1500 amperes per inch of electrode body diameter, and when the electrode has been consumed to the juncture of the body and neck portion reducing the electric current employed to provide amperes per inch of neck diameter between the same and one-sixth of the amperes per inch of diameter used while melting the body portion and employing the upper portion of the range of neck melting amperage when the body has been melted using current within the upper portion of its amperage range, and continuing to melt the neck portion of said electrode employing said reduced current until the diameter of the pool of molten metal in the top of the ingot produced is between one and one and one-third times the diameter of the neck portion of said electrode.

No references cited.